United States Patent Office 3,437,927
Patented Apr. 8, 1969

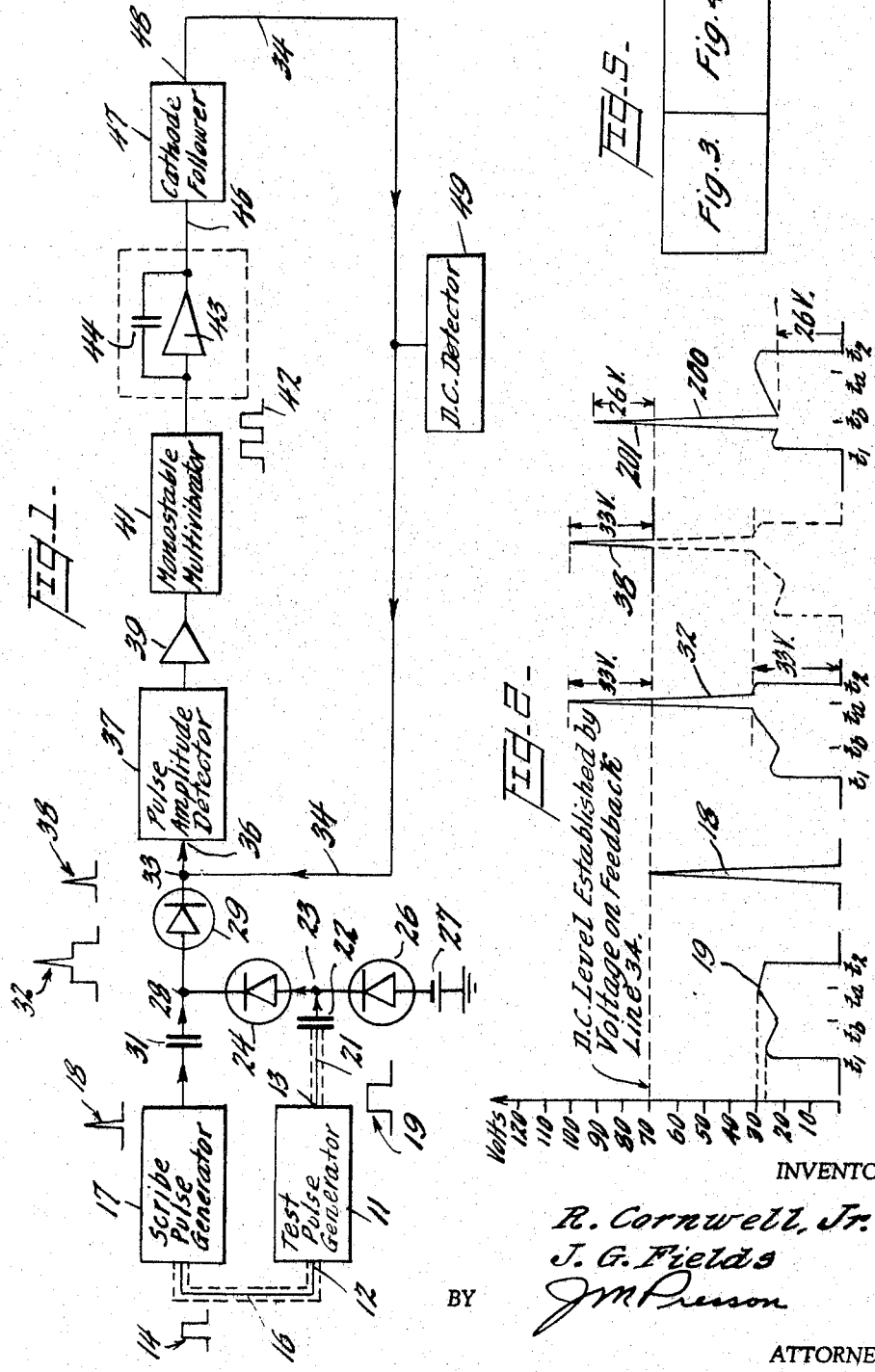

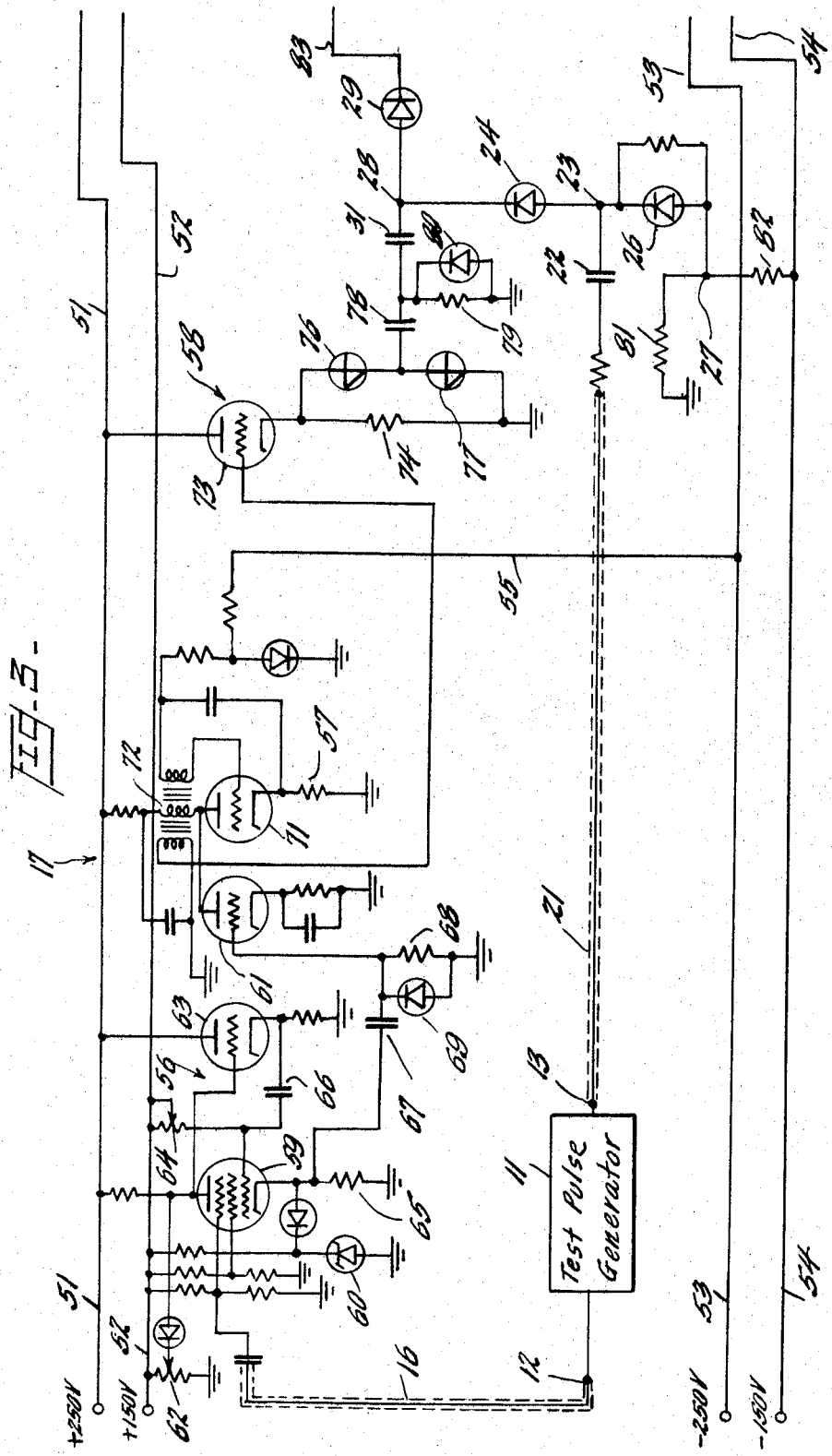

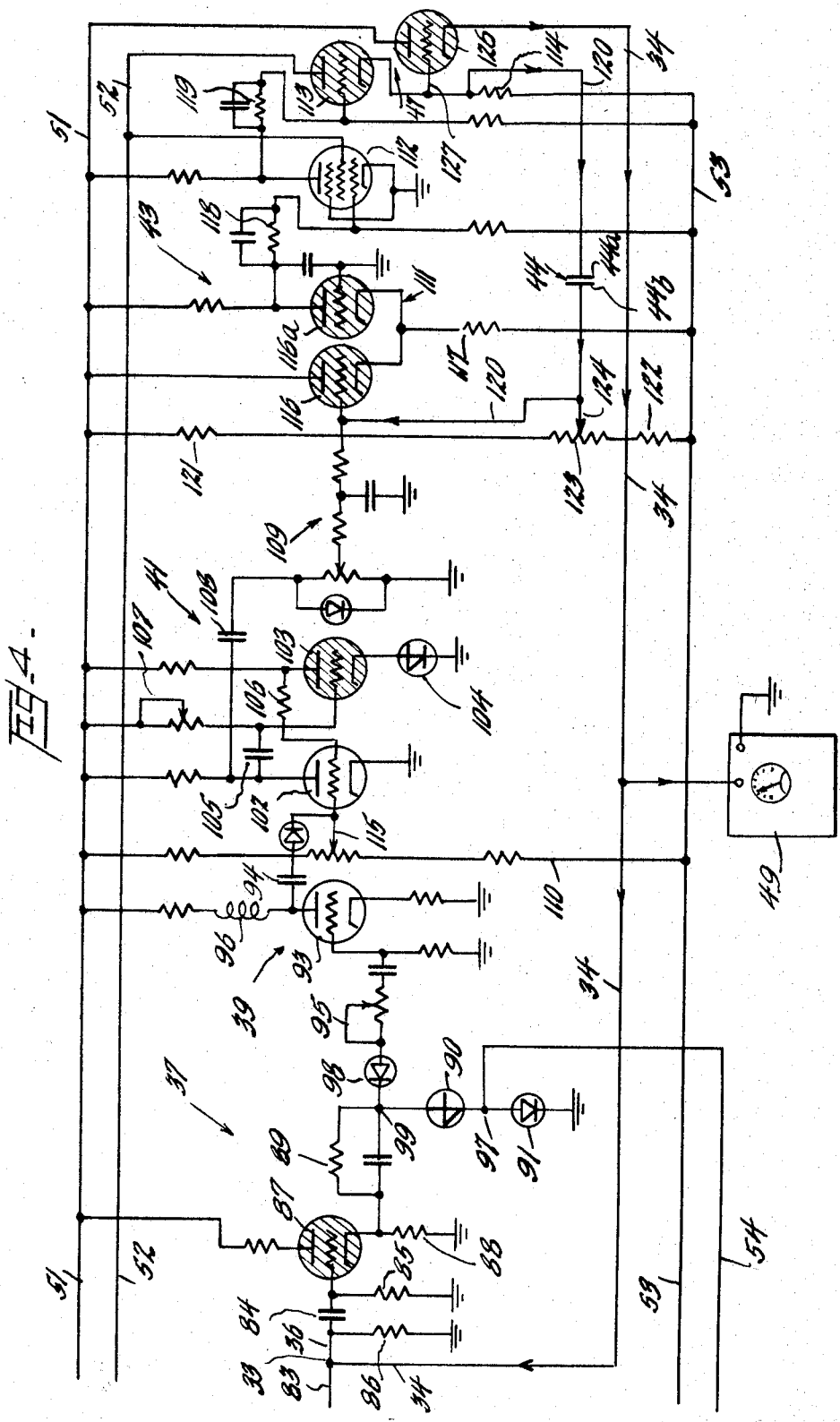

3,437,927
PEAK DETECTION SYSTEM FOR ARBITRARY PORTIONS OF REPETITIVE PULSES
Robert Cornwell, Jr., and John G. Fields, Burlington, N.C., assignors to Western Electric Company, Incorporated, New York, N.Y., a corporation of New York
Filed Feb. 2, 1966, Ser. No. 524,416
Int. Cl. G01r 19/04, 27/28
U.S. Cl. 324—102          3 Claims

ABSTRACT OF THE DISCLOSURE

Changes in threshold level of a peak detector are employed to measure an arbitrary portion of a relatively wide, repetitive test pulse. A relatively narrow repetitive pulse having a predetermined amplitude value and occurring at the first pulse rate is superimposed on the first pulse in time coincidence with the portion to be measured. The portion of the resulting composite pulse having an amplitude above the first value operates the peak detector, which generates a feedback signal that effectively raises the detector threshold level in discrete steps by an amount equal to the amplitude of the selected portion of the test pulse.

---

This invention relates to a method of and a system for, measuring the amplitude of electrical pulses, and more particularly to a method of and a system for, selectively measuring the amplitude of repetitive electrical pulses at any desired point along the crests of the pulses.

Several methods exist in the prior art for measuring the amplitude of unidirectional repetitive pulses. The most common method involves integrating the pulses with a resistance-capacitance circuit and measuring the resultant DC potential with a voltmeter. If the pulses being measured can be expressed by a simple mathematical formula as in the case of, for example, a triangular or square pulse, then this method will provide accurate results. If, however, the pulses have arbitrary pulse shapes which cannot be expressed by a relatively simple mathematical formula, then the results will be correspondingly relatively inaccurate, because the integrator will only generate approximate values of the pulse amplitudes.

Another widely used method involves feeding the pulses into a gating circuit which is momentarily opened to pass selected portions of the unknown pulses to an integrator. Since the gated pulses from the integrator are typically pulses of square shape, the pulse amplitude can be accurately measured. One disadvantage of this method, however, is that a finite time interval is required to open and close the gating circuit which imposes a time limitation on the operation of this type of circuit.

A third method, which is also in common use, involves displaying the pulses on the face of an oscilloscope and measuring their amplitude by counting divisions on the oscilloscope graticule. This method permits the determination of the pulse amplitude at any point along the pulse crest, but due to parallax and human reading error has an inherently limited accuracy.

It is a general object of this invention to provide a new and improved method of, and a system for measuring the amplitude of at least one electrical pulse having an arbitrary pulse shape.

More specifically, it is an object of this invention to provide a system for selectively positioning a relatively narrow pulse of predetermined amplitude on a pulse having at least the same width and an unknown amplitude to produce a composite pulse, and then measuring the amplitude of the composite pulse.

Another object of this invention is to provide a method of, and a circuit for selectively superimposing a pulse of known amplitude on a pulse of unknown amplitude to produce a pulse of composite amplitude, and for comparing the composite pulse with a feedback signal which successively increases in amplitude until the amplitude of the feedback signal is a function of the amplitude of the unknown pulse, and further for measuring the amplitude of the feedback signal.

A further object of this invention is to provide a circuit for generating pulses of substantially square shapes, the circuit having a long-term stability which is not deleteriously affected by circuit temperature fluctuations.

Still another object of the invention is to provide a circuit that utilizes a pair of diodes for adding the amplitudes of plural input pulses.

Yet another object of this invention is to provide a circuit for integrating the pulse output of a successively triggered pulse source to produce a feedback signal which is utilized to inhibit the generation of trigger pulses and the further integrating of the pulse source output.

With these and other objects in view, the present invention broadly contemplates a method of, and a circuit for combining unknown voltage pulses with selectively positioned pulses of predetermined amplitude to produce composite pulses, the composite pulses being utilized to vary the voltage level of a feedback circuit. A voltage level of the feedback circuit may then be measured to provide an accurate reading of the amplitude of the unknown pulses.

More specifically, in accordance with a preferred embodiment of this invention, a series of relatively narrow pulses having known and equal amplitude are individually superimposed upon a series of broader pulses of unknown amplitude. The composite pulses are successively clipped at a level which is typically, but not necessarily, equal to the amplitude of the known pulses and the remaining pulse increments are transmitted to a feedback signal generating circuit. In response to the received pulse increments, the feedback signal generating circuit provides a measurable voltage level which is a function of the amplitudes of the pulse increments.

A circuit for shifting the position of the pulses of known amplitude relative to the pulses of unknown amplitude, is also provided in accordance with the invention, so that the amount of variation in amplitude level of individual unknown pulses may be ascertained.

Other objects and advantages of the present invention will be apparent from the following detailed description when considered in conjunction with the following drawing, in which:

FIG. 1 is a block diagram of a pulse amplitude measuring circuit embodying the principles of the instant invention;

FIG. 2 is a graphic representation of typical pulses that are generated by the circuit illustrated in FIG. 1; and FIGS. 3 and 4 when combined in the manner indicated in FIG. 5, illustrate the detailed circuits and components that are included within the block diagram of FIG. 1.

Brief description of the invention

Referring to FIG. 1 of the drawings, there is shown a test pulse generator 11 for generating two pulse outputs of unknown amplitudes. The two pulse outputs are synchronized with each other, one pulse output appearing on an output line 12 and the other pulse output appearing on an output line 13 of the generator 11. A typical rectangular pulse that may be received by the line 12 from the generator 11 is referred to by the numeral 14 in FIG. 1. The pulse 14 is transmitted through a shielded conductor 16 to a scribe pulse generator 17 which produces a series of narrow scribe pulses 18 of precisely controlled amplitude. It should be understood that the terms "narrow," "broad" or "broader" when used herein in describing pulse widths are relative to each other and to a time base interval or period. Test pulses 19 whose amplitude is presently unknown and is to be measured by the circuit of this invention, are received by the output terminal 13 and are transmitted through a conductor 21 and an isolation capacitor 22 to a junction 23 of diodes 24 and 26. A small negative potential from a biasing source 27 reverse biases the diode 26 to clamp the test pulses 19 at a predetermined reference level.

The test pulses 19 pass through the diode 24 to a junction 28 of the diode 24 and a diode 29. Similarly, the scribe pulses 18 from scribe generator 17 pass through an isolation capacitor 31 to the junction 28 where they are superimposed on the pulses 19 to form a series of composite pulses 32.

The diode 29 is connected to a junction 33 of a feedback line 34 and to an input lead 36 of a pulse amplitude detector 37. A relatively large positive potential on lead 34 reverse biases the diode 29 to cut off portions of the composite pulses 32 so that a series of clipped pulses 38 are received by the input lead 36. In addition, an internal bias on the detector 37 acts to prevent the clipped pulses 38 from triggering the detector stage 37.

Any pulses having sufficient amplitude to trigger the detector 37 causes the detector to generate pulses which are amplified by the amplifier 39 and used to trigger a monostable multivibrator 41. The multivibrator 41 generates essentially square pulses 42 whose amplitudes are independent of the amplitudes of the pulses 38 applied to trigger the detector 37.

The pulses 42 from the multivibrator 41 are transmitted to a conventional operational amplifier 43 which integrates each output pulse from the multivibrator 41 and produces a linearly increasing potential on a capacitor 44 in the amplifier 43. This increasing potential is applied to an input lead 46 of a cathode-follower 47 whose output lead 48 is connected to the feedback line 34. Thus, whenever test pulses 19 and scribe pulses 18 are present at the junction 28 and the amplitude of clipped pulses 38 is sufficient to trigger the detector 37, the integrated pulse output will cause the feedback voltage amplitude on line 34 to further increase, which will reduce the amplitude of clipped pulses 38 until the pulse amplitude is no longer sufficient to trigger the detector 37. When this null condition occurs, the multivibrator 41 in the feedback signal generating circuit will cease to operate.

If the amplitude of the test pulses 19 should increase, the null condition at the junction 33 will be altered and the multivibrator 41 will again start to generate a pulse output until the charge on the capaictor 44, and hence the potential on the feedback line 34 again rises to a null voltage condition.

A DC detector 49 may be connected to the feedback line 34 to measure the amplitude of the DC feedback voltage on the line 34. As previously discussed, with no output from the test generator 11, the voltage on the line 34 may be adjusted so that the detector 37 will respond to the presence of scribe pulses 18 alone. Thus, any increase in the feedback voltage on the line 34 above the null established at the junction 33 by the scribe pulses alone will be equal to the amplitude of the input pulses 19. The value of this increase may be obtained by subtracting the voltage reading on detector 49 with the generator 11 connected to the circuit from the voltage reading obtained when the generator 11 is not connected to the circuit.

The scribe pulses 18 may be delayed with respect to the test pulses 19 by an appropriate adjustment of scribe pulse generator 17. This permits the detector 49 to give an amplitude reading of the pulses 19 at any point along their crests.

*Detailed description of the invention*

Referring to FIGS. 3 and 4, leads 51 and 52 are connected to positive DC power sources (not shown) of typically 250 volts and 150 volts, respectively. Leads 53 and 54 are connected to negative DC power sources of typically 250 volts and 28 volts, respectively. The various stages of the instant circuit are connected to certain of these leads as will be apparent.

The test pulse generator 11, whose output is to be measured, has one output terminal 12 and another output terminal 13. The generator 11 produces a synchronizing pulse 14 (FIG. 1) at the output terminal 12 for every test pulse 19 (FIG. 1), which is produced at the output terminal 13. A shielded conductor 16 connects the output terminal 12 to a scribe pulse generator 17, which generates a series of relatively narrow width scribe pulses 19 (FIG. 1) of a precisely controlled magnitude. The width of the pulses 18 is typically on the order of a fraction of the width of the test pulse.

The scribe pulse generator 17 comprises a phantastron 56, a blocking oscillator 57, and a pulse shaping circuit 58.

The phantastron 56 is basically a conventional phantastron which has been modified to provide a cathode-following action. The phantastron 56 includes a pentode 59 having a plate that is initially biased out of conduction by a negative suppressor-to-cathode potential. The negative suppressor-to-cathode voltage is limited by a normally conducting Zener diode 60 in the cathode circuit of the pentode 59. The plate potential of the pentode 59 is established by a variable resistor 62 connected to positive DC power lead 52. The screen grid of pentode 59 is conducting heavily as a result of the positive potential on the control grid of the pentode 59 which is also connected to the positive lead 52 through a variable resistor 64. Accordingly, a positive cathode potential is initially developed across cathode resistor 65.

A positive pulse applied to the lead 16 and thus to the suppressor grid of the pentode 59, causes the plate of the pentode 59 to draw current. When the plate of the pentode 59 conducts, its drop in potential is coupled through the cathode follower 65 and capacitor 66 to the control grid of 59. This drop in potential on the control grid of the pentode 59 reduces its cathode current, thereby reducing the positive potential developed across the cathode resistor 65. A no-signal potential on the suppressor grid is no longer sufficient to render the plate of the pentode nonconductive.

The rate at which the plate potential of the pentode 59 decreases is controlled by the resistor 64 and the capacitor 66, and this rate in turn determines the time interval required for the plate of the pentode to reach saturation. When the plate reaches saturation, the negative potential caused by the negatively-going plate potential is no longer present on the control grid of the pentode 59 and the cathode current increases. This increase in cathode current develops a more positive cathode potential across the cathode resistor 65 which renders the suppressor-to-cathode potential of the pentode more negative. The screen grid, and not the plate, draws the major portion of the cathode current as the suppressor bias reduces the plate current. A decrease in plate current causes a rise in plate potential which is applied to the control grid of the pentode 59 and rapidly drives the pentode back to its initial state.

The potential developed across the cathode resistor 65 of the pentode 59 is differentiated by a network comprising a capacitor 67 that is in series with a parallel combination of a resistor 68 and a diode 69. The differentiated output of this network is applied to the grid of the triode 61.

The pulse widths of the pulses that are generated by the phantastron 56 are controlled by the settings of the variable resistors 62 and 64. The resistors 62 and 64 serve as coarse and fine controls, respectively, for the phantastron 56. The leading edges of the phantastron output pulses are controlled by synchronized trigger pulses from the pulse generator and therefore cannot be varied. However, the trailing edges of the phantastron output pulses, which are differentiated by the capacitor 67 and the resistor 68, may be time-delayed over a relatively wide range with respect to the trigger pulses by suitable adjustments of the resistors 62 and 64. Thus, by appropriate adjustment of the resistors 62 and 64 the scribe pulse widths may be increased or decreased by the phantastron 56.

The blocking oscillator 57 comprises two triodes 61 and 71 and a low inductance transformer 72. The transformer 72 has a primary winding, a secondary winding, and a tertiary or output winding. The plates of triodes 61 and 71 are both connected through the primary winding to the power line 51 while the secondary winding is connected in a regenerative fashion to the grid of tube 71. The tube 61 is normally held in a low conducting state by the self-bias of its cathode circuit.

When a positive differentiated output pulse is applied to the grid circuit of the tube 61 by the phantastron 56, the tube 61 is driven into a high state of conduction, and a regenerative positive feedback pulse is received from the secondary winding of the transformer 72 by the grid of tube 71. This positive pulse overcomes the negative bias that is applied to the tube 71 by the lead 55 and the line 53, and rapidly increases the current flow through the primary winding until the magnetic core of the transformer 72 becomes saturated. When the transformer 72 reaches saturation the regenerative feedback of positive pulses ceases. After a short interval of time, determined primarily by the resistance and capacitance values of the transformer 72, the saturation level of the transformer 72 drops low enough to cut off conduction in both tubes 61 and 71. During this period, a narrow width, high amplitude, positive pulse is generated in the tertiary winding of the transformer 72 and this pulse is applied as an input pulse to the pulse shaping circuit 58.

Since the phantastron 56 and the blocking oscillator 57, previously described, are conventional, other circuits could be substituted therefor to produce essentially the same results. For example, suitably designed monostable multivibrators might be substituted for the oscillator 57 and the phantastron 56.

The pulse shaping circuit 58 comprises a triode 73 with a grounded resistor 74 in the cathode circuit of the triode 73. A pair of series-connected PNPN snap-action diodes 76 and 77 are connected in parallel with the resistor 74.

In general, a PNPN diode is a two terminal, bistable semiconductive device having two stable states: a high impedance state, typically one megohm or more, and a low impedance state, typically 15 ohms or less. As the voltage across the diode is gradually increased, a voltage level is reached where the diode rapidly switches from its high impedance state to its low impedance state. The voltage required to switch the diode from one state to another state is called the breakdown voltage and can be accurately determined. Once the diode has been switched to its low impedance state, it requires only a small sustaining voltage to maintain it in this state. If, however, the sustaining voltage or the corresponding sustaining current, falls below the breakdown voltage, the diode rapidly switches back to the high impedance state. A more detailed description of the characteristics of the PNPN diode may, for instance, be found in U.S. Patent 2,855,524, issued on Oct. 7, 1958, to W. Shockley.

A network comprising a capacitor 78 and a resistor 79 connects the junction of the PNPN diodes 76 and 77 to ground. A diode 80 is connected across the terminals of the resistor 79 in the manner illustrated by FIG. 3. When the positive pulse from the blocking oscillator 57 is applied to the grid of triode 73, the triode 73 is rendered conductive and the potential across the cathode resistor 74 rises rapidly. This rapidly increasing potential appears across the series combination of the diodes 76 and 77.

The diodes 76 and 77 are selected to have essentially identical characteristics, and since the diode 77 is connected in parallel with the capacitor 78 and the resistor 79, the impedance offered by the diode 77 to current from the cathode of the tube 73 will be slightly lower than the impedance offered to this current by the diode 76. Since the two diodes are bridged in voltage divider fashion across the cathode resistor 74, this unequal impedance of the diodes 76 and 77 results in an unequal voltage division and consequently the voltage across the diode 76 will be higher than the voltage across the diode 77.

When the voltage across the diode 76 rises to the critical breakdown potential of this diode, the diode 76 snaps into its low impedance state. The voltage being developed across the diode 77 immediately rises to the critical breakdown voltage, causing a corresponding sharp rise in the voltage at the junction between diodes 76 and 77. This sharp rise in voltage forms the leading edge of a voltage pulse. A fraction of a microsecond later, the diode 77 also snaps into its low impedance state by virtue of the increased voltage that is now across this diode.

When the diode 77 snaps into its low impedance state, the potential at the junction of the diodes 76 and 77 drops to virtually ground level or zero volts. Thus, the high amplitude positive pulse appearing at the grid of the triode 73 is shaped by the aforedescribed circuit into a scribe pulse of known and predetermined amplitude established by the voltage breakdown characteristics of diodes 76 and 77. The scribe pulse has a pulse width which is primarily determined by the time required for the diode 77 to turn-on and the slope of the leading edge of the pulse.

Since the breakdown and turn-on characteristics of the diodes 76 and 77 can be regulated with a high degree of accuracy, the scribe pulses produced by the shaping circuit 58 are stable, both in amplitude and pulsewidth and practically constitute impulse functions.

When the pulse from blocking oscillator 57 falls to essentially zero amplitude, the positive bias is removed from the grid of triode 73 and the potential across the cathode resistor 74 falls to its original level. This level is too low to maintain the sustaining current through the diodes 76 and 77, and these diodes thereupon switch back to their high impedance state to await the next pulse from the blocking oscillator 57.

The scribe pulses generated at the junction of diodes 76 and 77 pass through the network capacitor 78 and the DC isolation capacitor 31 and are received by the junction 28 that is common to the conventional diodes 24 and 29.

Simultaneously with the aforedescribed operation of the scribe pulse generator 17, the test pulses from generator 11 which are to be measured, are transmitted through the connector 21 and the DC isolation capacitor 22 to the junction 23 that is common to the conventional diodes 24 and 26. The biasing source 27 comprises a resistor 81 and a resistor 82 that are connected to the negative voltage lead 54. The resistors 81 and 82 form a voltage divider for the anode of the diode 26. The negative voltage at the anode of the diode 26 reverse biases the diode 26 slightly to clamp the junction 23 at a predetermined reference potential that is more negative than zero volts.

Any test pulses from generator 11, will forward-bias the diode 24 and appear at the junction 28 where they are algebraically added to the scribe pulses from the pulse shaping circuit 58. The addition of the scribe and test pulses at the junction 23 produces a series of composite pulses 32, FIG. 1, each having an amplitude equal to the sum of the amplitudes of the scribe pulses and the instantaneous amplitude of the test pulses.

Each of the composite pulses is received by the diode 29 whose cathode lead 83, FIG. 4, is connected to the junction 33 that is common to the feedback lead 34 and the input lead 36 of the pulse amplitude detector 37. A positive potential on the feedback lead 34 reverse biases the diode 29 to clip each composite pulse 32, FIG. 1, so that only the upper or peak portion 38, FIG. 1, of the composite pulse passes through the diode 29 to the input lead 36 of the detector 37.

A pi network formed by a coupling capacitor 84 and two resistors 85 and 86 is connected to receive voltages applied to the junction 33. The resistor 85 is a grid resistor for a cathode-follower 87 and the resistor 86 is a cathode resistor for a cathode-follower 126. The detector 37 includes the coupling capacitor 84, the grid resistor 85, the cathode-follower 87 having a cathode resistor 88, a resistance-capacitance parallel circuit 89, a PNPN snap-action diode 90 and a standard PN diode 91. The cathode terminal of the snap-action diode 90 is clamped at the assumed −28 volt level of the lead 54, the lead 54 being connected to the cathode of the diode 90 at junction 97. The anode of the diode 91 is also connected to the junction 97. The anode of the snap-action diode 90 and the cathode of an isolation diode 98 are connected at a common junction 99 to one side of the resistance-capacitance parallel circuit 89. With the junction 97 at negative voltage level and by virtue of the cathode-following action of the cathode-follower 87, the voltage at the junction 99 is normally slightly positive, but not positive enough to exceed the breakdown voltage of the snap-action diode 90. During the period when the voltage at the junction 99 is going positive, but has not yet become sufficiently positive to exceed the breakdown voltage of the diode 90, the diode 91 holds the voltage at the junction 99 below a level which would cause operation of the amplifier 93. Further, it has been observed that the diode 91 prevents forward surges of current through the conducting diode 90 from appearing on the lead 54. The diode 98 isolates the grid circuit of the amplifier 93 from positive pulse inputs.

The clipped pulse 38, FIG. 1, that is applied to the junction 33 and hence to the detector 37, passes through the coupling capacitor 84 and appears as a voltage signal on the grid resistor 85 of the cathode-follower 87. The cathode-following action of the tube 87 causes a pulse of proportionate amplitude to appear at the junction 99 and this pulse will drive the voltage at that junction to a more positive level. When the voltage at the junction 99 finally exceeds the breakdown voltage of the snap-action diode 90, the diode 90 momentarily snaps into its low impedance state, driving the voltage at the junction 99 negative for an instant. The sharp negative pulse developed at the junction 99 by the snap-action diode 90 is received by the grid of the amplifier circuit 39.

The amplifier circuit 39 includes a conventional high-gain pulse amplifier 93 and a coupling capacitor 94. The amplifier 93 is preferably of a type that is highly responsive to positive or negative pulse inputs. The bias that is applied to the amplifier 93 may be adjusted by a slide wire resistor 95. A coil 96 is included in the plate circuit of the amplifier 93 for peaking the time response of the tube 93 to pulse inputs.

The negative pulse applied to the grid of the amplifier 93 appears as an amplified and phase inverted positive pulse on the plate of the amplifier 93 and this positive pulse passes through the capacitor 94 and appears as a driving pulse input to the monostable multivibrator 41.

The multivibrator 41 includes a normally nonconducting triode 102 and a normally conducting triode 103. The plate of triode 102 is coupled by a capacitor 105 to the grid of the triode 103 and similarly the plate of the triode 103 is coupled through a resistor 106 to the grid of triode 102.

A PNPN snap-action diode 104 is connected between the cathode of the triode 103 and ground. The positive potential from the lead 51 is applied through a variable resistor 107 to the grid of the triode 103 to maintain it in a heavily conducting state. The PNPN diode 104 is therefore held in its low impedance state. Negative voltage supplied by the lead 53 to a lead 110 is tapped-off by a slide wire 115 to the grid of triode 102 to bias the tube 102 into the nonconductive state.

When an incoming positive pulse is received from the amplifier 39 the negative bias on the grid of triode 102 is overcome and the tube 102 conducts. The resulting drop in plate potential is coupled through the capacitor 105 to the grid of the triode 103 and momentarily overcomes the +250 volt bias applied by the lead 51. The resultant momentary drop in current through triode 103 causes the PNPN diode 104 to switch back to its high impedance state. The capacitor 105 now starts to charge through resistor 107, from the potential of the momentary negative cutoff pulse towards the positive potential of the lead 51.

In a conventional multivibrator, there would be no snap-action diode 104 in the cathode circuit of the triode 103, and the triode 103 would conduct as soon as the capacitor 105 accumulated sufficient charge to raise the potential on the grid of triode 103 to the cutoff potential. The cutoff voltage level of a vacuum tube ordinarily varies with the age and temperature of the tube. In addition, variations in the cutoff level typically vary from tube to tube within the same class and type of tubes. Thus, while the cutoff voltage level of a tube is fixed by the occurrence of the trigger pulses, which is accurately known, the tube turn-on time is ordinarily subject to considerable variation.

Such variations in the tube cutoff voltage is overcome in accordance with the principles of the present invention by incorporating the PNPN diode 104 in the cathode circuit of the triode 103. As previously mentioned, when the triode 103 is cut off, the PNPN diode 104 snaps into the high impedance state, and assumes an impedance value of typically one megohm or higher. Thus, as the potential on the grid of triode 102 increases from its initial negative potential to the cutoff voltage level, triode 103 will not conduct because the diode 104 is in its high impedance state. When the potential on the grid of triode 103 further increases to a positive value equal to the breakdown potential of the PNPN diode 104, the diode 104 snaps into its low impedance state and applies a large positive pulse between the grid and the cathode of the triode 103. The triode 103 is thereby driven to conduct heavily and the corresponding drop in plate potential is coupled through the resistor 106 to the grid of the triode 102 to turn triode 102 off.

Thus, the potential at which the tube 103 switches is no longer determined by its cutoff characteristics, and the control of the multivibrator 41 has been shifted from the grid of the tube 103 to the diode 104 connected to the cathode of the tube 103. The duration of the pulses produced by multivibrator 41 is, of course, determined by the impedance values of the resistor 107 and the capacitor 106, but the stability of the pulse widths, particularly over long periods of operation, is controlled by the characteristics of the diode 104. In cases where extreme pulse stability is required, the diode 104 may be enclosed in a thermostatically controlled electric oven (not shown) which may be similar to the type of ovens used to control the frequency of quartz crystal oscillators.

Thus, each clipped pulse which succeeds in triggering the detector 37 causes the multivibrator 41 to generate an essentially square pulse of known amplitude and pulse width. The output from the multivibrator 41 is coupled by a capacitor 108 to a T network 109 which filters and smooths out the multivibrator output to produce a negative fluctuating DC potential. This DC potential is then coupled to the input of the operational amplifier 43.

The operational amplifier 43 comprises a quasi-differential amplifier 111, a high-gain pentode 112, and a cathode follower 113. One terminal of a cathode resistor 114 is connected to the cathode of the tube 113 and the other terminal of the cathode resistor 114 is connected to the negative lead 53. The differential amplifier 111 includes a pair of essentially identical triodes 116 and 116a that are cross-coupled to one terminal of a common cathode resistor 117. With no signal input both triodes 116 and 116a are rendered conductive by a small bias between the grid and the cathode terminals of the cathode resistor 117. When the fluctuating negative DC signal from the filter 109 is applied to the grid of triode 116, the current through the tube 116 decreases. This decrease in current in the tube 116 causes an increase in current flow through tube 116a and results in a corresponding drop in the plate potential of the tube 116a.

This drop in plate potential of the tube 116a passes through a resistor 118 to the input of the high gain pentode 112. The amplified and phase-inverted positive output from the pentode 112 is essentially a positive DC signal which passes through a resistor 119 to the input of the cathode follower 113. When a positive voltage is applied to the grid of the cathode follower 113, the normally conductive tube 112 increases its rate of conduction. The increased rate of conduction of tube 113 is reflected in an increase in the voltage across the capacitor 44. By virtue of a feedback lead 120 an increase is also effected in the voltage on the grid of the triode 116. The level of the positive increase of the voltage on the grid of the triode 116 is proportional to the rate of positive increase of the voltage at the cathode of cathode follower 113.

A voltage divider comprising fixed resistors 121 and 122 and a variable resistor 123 is connected at one end to the positive lead 51 and at the other end to the negative lead 53. A slide wire 124 that contacts the variable resistor 123 is bridged to the feedback lead 120 and may be adjusted to apply a zero voltage to the grid of triode 116 when there are not output pulses from the multivibrator 41.

As the negative fluctuating DC voltage signal is applied to the grid of the triode 116 of the amplifier 43, and passes through the various stages of the operational amplifier, a correspondingly increasing positive DC is applied to the plate 44a of the capacitor 44 and the AC component of the signal passes through the capacitor 44 and continues over feedback line 120 to the grid of the triode 116 to increase the voltage level of the tube grid.

In the absence of output pulses from the multivibrator 41, the slide wire 124 of the resistor 123 holds the grid of the triode 116 slightly positive. This positive voltage causes the voltage on the cathode of the cathode follower 113 to decrease until pulses are again generated by the multivibrator 41 or an amplitude limit is reached as determined by the saturation characteristics of the pentode 112. When the cathode follower 113 is rendered more conductive by positive voltage signals from the pentode 112, the positive-going pulses appearing on the cathode pass through the capacitor 44 to the grid of the triode 116 and the capacitor 44 partially integrates these pulses. In addition, the potential on the plate 44a of the capacitor 44 rises to become more and more positive with each pulse received and accordingly the voltage across the capacitor 44 steadily increases and drives the cathode of the cathode follower 113 more positive.

A triode 126 is maintained normally conductive by the normally positive voltage on the cathode of the cathode follower 113. The triode 126 has a grid lead 127 connected to the cathode of the cathode follower 113 and, therefore, when the voltage on the plate 44a of the capacitor 44 became more positive, voltage on the grid lead 127 increases and renders the triode 126 more conductive. When the triode 126 is rendered more conductive, the voltage of the feedback line 34 correspondingly rises and further reverse-biases the diode 29, FIG. 3, at the input of the detector 37.

A suitable voltage measuring instrument 49 such as, for example, a vacuum tube voltmeter, has one terminal connected to the feedback line 34; the other terminal connected to ground so that the voltmeter measures provide an indication of the amplitude voltage on the line 34.

*Description of operation*

In operation, the test pulse generator 11 is connected to the measuring circuit, described in detail hereinabove. Referring to FIG. 2, a typical output test pulse 19 from the generator 11 is shown to have a maximum peak amplitude of approximately +33 volts $t=t_a$, and a minimum amplitude of approximately +25 volts $t=t_b$. It will be understood that the pulse 19 is merely exemplary of one possible pulse shape, and that test pulses having other shapes such as rectangular, square, or triangular could also be applied to the circuit of this invention.

The output test pulse 19 is received by the junction 23 of the diodes 24 and 26 where it is clamped to a predetermined voltage level and passed to the junction 28 to await the superimposition of a scribe pulse 18 from the scribe pulse generator 17.

The scribe pulse generator 17 receives synchronized scribe pulses from the test scribe generator 11 and these pulses trigger the phantastron 56. Preferably, each synchronizing or unshaped scribe pulse from the generator 11 is generated a fraction of a pulse increment prior to the generation of each test pulse or, conversely, the generation of each test pulse is time-delayed slightly with respect to the generation of each synchronizing pulse. This time delay between the test and synchronizing pulses permits the trailing edges of the scribe pulses generated by phantastron 56 and, hence, the output pulses from the blocking oscillator 57, to occur at least at the beginning of the test pulses 19. The minimum desirable time advance of the synchronizing pulse relative to the test pulse is at least equal to the time required for the synchronizing pulses to pass through the phantastron 56, the blocking oscillator 57, and the pulse shaper 58.

The output pulse from the phantastron 56 is transmitted to the blocking oscillator 57 where the trailing edge generates a narrow pulse which is shaped by the circuit 58 to produce the desired narrow scribe pulse. By increasing the width of the pulses generated by the phantastron 56 through adjustment of the resistors 62 and 66, the scribe pulses may be effectively positioned at any desired point on the crest or peak of the test pulse to selectively measure the amplitude of any point along the test pulse crest or peak.

Referring again to FIG. 2, a typical scribe pulse 18, having a precisely predetermined amplitude of +70 volts, is shown. Such a pulse would require that each of the PNPN diodes 76 and 77, FIG. 3, in the pulse shaping circuit 58, having a corresponding breakdown voltage of 70 volts, is shown. Such a pulse would require that each of the PNPN diodes 76 and 77, FIG. 3, in the pulse shaping circuit 58, have a corresponding breakdown voltage of 70 volts. Pulse 32, FIG. 2, is illustrative of a typical composite pulse produced at the junction 28 when the scribe pulse 18 is superimposed on a test pulse 19, and the phantastron 56, FIG. 3, is adjusted to position the scribe pulse 18, FIG. 2, at $t=t_a$; that is, when the pulse 19 has maximum amplitude. Pulse 200 illustrates the situation when the scribe pulse 18 is positioned to occur at $t=t_b$; the minimum instantaneous amplitude of pulse 19.

The test pulse 19 and the scribe pulse 18 are now applied to the input of pulse amplitude detector 37. As discussed previously, the positive potential on the feedback line 34, which is used to reverse bias the diode 29, and the critical-voltage level of the PNPN diode 90 of the detector 37 have values such that together they act to prevent any composite pulse having an amplitude less than the amplitude of the scribe pulse 18 from operating the detector 37.

For a typical scribe pulse having a known amplitude of +70 volts, a typical pulse amplitude required to trigger the PNPN diode 90 might be +15 volts, and the bias on the feedback lead 34 would therefore be +55 volts. Thus, only composite pulses having amplitudes exceeding +70 volts would produce pulses at the output of detector 37.

Referring again to FIG. 2, pulse 32 has an assumed maximum amplitude of approximately 103 volts. With an assumed effective negative bias of −70 volts on the detector 37, the pulse 32 would have sufficient amplitude to place a positive pulse 38 of amplitude +103−70 or +33 volts, on the grid of the triode 87. This +33 volt pulse will trigger the detector 37. Similarly, pulse 200 would apply a pulse 201 amplitude of +96−70 or +26 volts, to the grid of the triode 87, which would also operate the detector 37. In both of the above cases, the voltage detector 128 would initially indicate the steady state voltage on the line 83, that is, +55 volts.

Assuming that pulses of sufficient amplitude are applied to the grid of the triode 87, the output of the detector 37 causes the PNPN diode 90 to apply a negative pulse on the grid of the amplifier 39. The amplified and phase-inverted pulse output from the amplifier 39 is used to trigger the monostable vibrator 41, which produces one pulse for each pulse of essentially square shape passing through the detector 37. Typically, the pulse width of each output pulse from the multivibrator 41 would be on the order of 20 milliseconds. Each output pulse from the multivibrator 41 is passed to the operational amplifier 43, where the capacitor 44 integrates the pulses and produces a steadily increasing positive potential on the plate 44a. Each pulse from the multivibrator 41 will increase the charge on the plate 44a of the capacitor 44 by a small increment.

Thus, as long as the multivibrator 41 continues to receive triggering pulses from the detector 37 and continues to generate output pulses, the potential on the capacitor 44 will steadily rise until the amplifier 43 reaches its saturation level. This level will not be reached in practice because the positive potential on the capacitor 44 is also being applied to the cathode follower 113 and, hence, to the feedback lead 34. As the charge on the capacitor 44 increases, the back-bias of the diode 29 increases so that the effective bias on the grid of the detector 37 increases to inhibit the passage of clipped pulses 38, FIG. 1, through the detector 37.

The +33 volt pulses 38, FIG. 2, which are assumed to be applied to the grid of the detector 37 successively trigger the multivibrator 41 which successively increases the charge of the capacitor 44 and the voltage level of the feedback line 34 from its assumed value of +55 volts to 55+33 or +88 volts. At this point, the effective bias on the grid of the detector 37 will be −103 volts, and the incoming composite pulse 32, FIG. 2, would no longer have sufficient amplitude to operate the detector 37 and trigger the multivibrator 41. The potential across capacitor 44 will now cease to increase, and the steady-state condition will be reached.

Since the initial reading on the voltage measuring instrument 128 was +55 volts, and the steady-state value is now 88 volts, the difference, 33 volts, corresponds to the instantaneous amplitude of the pulse 19, FIG. 2, at $t = t_a$.

Since resistor 123 is adjusted for a slight positive potential, the charge on the plate 44a will slowly decrease between successive output pulses from the multivibrator 41. Thus, the voltage across the capacitor 44 may fluctuate slightly. However, by suitable choice of the multivibrator 41, these fluctuations in the voltage level of the capacitor 44 will be minimal and wholly dampened out by the inertia of the voltage measuring instrument 128.

The voltage measuring instrument 128 may be a conventional differential voltage measuring instrument, which may be calibrated so that with a voltage on the lead 34 of, for example +55 volts, the instrument 128 will read null or zero. This type of instrument would provide an operator with a reading of the instantaneous amplitude of the pulse 19.

What is claimed is:
1. A peak detection system for measuring the amplitude of an arbitrary portion of a repetitive electrical pulse, which comprises:
  a first source of repetitive, relatively wide test pulses of unknown amplitude;
  a second source of repetitive, relatively narrow reference pulses of known and essentially identical amplitude, said second source being synchronized with said first source so that the test and reference pulses occur at the same rate;
  means for adjusting the relative phases of the test and reference pulses to bring each reference pulse into time coincidence with the portion of the test pulse to be measured;
  a circuit for adding the test and reference pulses to form pulses of composite amplitude;
  means coupled to said circuit for clipping the composite pulses at said known amplitude and for transmitting the portion of each composite pulse whose amplitude is above the known amplitude;
  means coupled to the clipping means and responsive to the transmitted pulse portions therefrom for generating a feedback signal whose amplitude increases in proportion to the number of transmitted pulse portions applied to the generating means and for inhibiting the operation of said clipping means when the feedback signal has increased by an amount equal to the peak amplitude of the transmitted pulse portions; and
  means coupled to said generating means for measuring the amplitude of the feedback signal.

2. In a peak detection apparatus for determining the amplitude of an arbitrary portion of a relatively wide test pulse which recurs at a first rate:
  means for generating a repetitive, relatively narrow reference pulse at the first rate, the amplitude of the reference pulse having a predetermined first value;
  means for adjusting the relative phases of the reference and test pulses to bring each reference pulse into time coincidence with the test pulse portion to be measured;
  means for superposing the reference and test pulses to produce a recurrent composite third pulse whose amplitude is determined by the sum of the amplitudes of the reference and test pulses;
  normally disabled threshold-operated means responsive, when enabled, to a succession of control pulses applied thereto for generating a first DC level that increases in proportion to the number of control pulses in the succession, the generating means being enabled when the amplitude of the control pulses becomes greater than the above-mentioned first value and disabled when the amplitude of the control pulse falls below the first value;
  means for combining the first DC level with the amplitude of successive ones of the composite pulses to produce the succession of control pulses; and
  means for applying the succession of control pulses to the input of the generating means, whereby the threshold value of said threshold-operated means is raised by the value of the test pulse.

3. Apparatus as defined in claim 2, in which the threshold operated means comprises, in combination, means for detecting each control pulse having an amplitude above the first value; means coupled to the detecting means for producing a pulse of fixed amplitude and fixed width each time a control pulse is detected; and means for integrating the pulses from the last-mentioned producing means to yield a signal whose average component is the first DC level.

References Cited

UNITED STATES PATENTS

| | | | |
|---|---|---|---|
| 2,806,175 | 9/1957 | Hansen | 324—140 |
| 3,111,634 | 11/1963 | Ammerman et al. | 332—52 |
| 3,328,705 | 6/1967 | Eubanks | 324—103 XR |

OTHER REFERENCES

MacKenzie: Electronics, June 17, 1960, p. 57.

RUDOLPH V. ROLINEC, *Primary Examiner.*

E. F. KARLSEN, *Assistant Examiner.*

U.S. Cl. X.R.

324—103; 328—151